United States Patent [19]
de Kock

[11] Patent Number: 5,044,474
[45] Date of Patent: Sep. 3, 1991

[54] ELECTRICALLY ADJUSTABLE SHOCK ABSORBER

[75] Inventor: Cornelis de Kock, Oud-Beijerland, Netherlands

[73] Assignee: Koni B.V., Oud-Beijerland, Netherlands

[21] Appl. No.: 188,641

[22] Filed: May 5, 1988

Related U.S. Application Data

[63] Continuation of Ser. No. 927,321, Nov. 4, 1986, abandoned.

[30] Foreign Application Priority Data

Nov. 5, 1985 [NL] Netherlands .......................... 8503031

[51] Int. Cl.$^5$ .............................................. F16F 9/34
[52] U.S. Cl. .................. 188/319; 137/614.2; 188/299; 188/320; 188/322.15
[58] Field of Search .......... 188/319, 285, 299, 322.15, 188/320; 137/614.2; 267/127; 280/714

[56] References Cited

U.S. PATENT DOCUMENTS

| | | | |
|---|---|---|---|
| 1,267,532 | 5/1918 | Flentje | 188/319 X |
| 2,740,500 | 4/1956 | Brundrett et al. | 188/322.15 |
| 3,365,033 | 1/1968 | Willich | 188/319 |
| 3,559,776 | 2/1971 | Schultze | 188/319 X |
| 4,463,839 | 8/1984 | Ashiba | 188/319 X |
| 4,530,425 | 7/1985 | Veaux et al. | 188/319 X |
| 4,535,877 | 8/1985 | Shimokura | 137/614.2 X |
| 4,635,765 | 1/1987 | Schmidt | 188/319 X |
| 4,645,043 | 2/1987 | Imaizumi | 188/322.15 X |

FOREIGN PATENT DOCUMENTS

| | | | |
|---|---|---|---|
| 196030 | 10/1986 | European Pat. Off. | 188/322.15 |
| 1063859 | 8/1959 | Fed. Rep. of Germany | 188/319 |
| 1281865 | 10/1968 | Fed. Rep. of Germany | 188/319 |
| 3241984 | 9/1983 | Fed. Rep. of Germany . | |
| 3418649 | 11/1984 | Fed. Rep. of Germany . | |
| 3323405 | 1/1985 | Fed. Rep. of Germany . | |
| 3434566 | 4/1985 | Fed. Rep. of Germany . | |
| 3511169 | 10/1985 | Fed. Rep. of Germany | 188/299 |
| 189338 | 8/1986 | Japan | 188/299 |
| 6615269 | 5/1967 | Netherlands . | |
| 2123922 | 2/1984 | United Kingdom | 188/319 |
| 2126687 | 3/1984 | United Kingdom . | |
| 2159917 | 12/1985 | United Kingdom | 188/319 |

Primary Examiner—George E. A. Halvosa
Attorney, Agent, or Firm—Robert P. Seitter; J. Gordon Lewis

[57] ABSTRACT

An electrically adjustable shock absorber is disclosed which includes a piston-cylinder assembly with a shock absorbing device. An electrically adjustable cylindrical slide is arranged in a tubular extension which is attached to the piston and which affects the shock absorption device by closing off at least one fluid opening provided in the extension wall to the shock absorbing device.

3 Claims, 2 Drawing Sheets

ELECTRICALLY ADJUSTABLE SHOCK ABSORBER

This application is a continuation of application Ser. No. 927,321, filed Nov. 4, 1986, now abandoned.

BACKGROUND OF THE INVENTION

The present invention relates to an electrically adjustable shock absorber of the type including a piston-cylinder assembly, provided with a shock-absorbing device, an electrically adjustable cylindrical slide arranged in a case extension attached to the piston which slide affects the shock absorption characteristics by closing off at least one throughflow opening for the shock absorber fluid.

Such a device is disclosed in the German "Offenlegungsschrift" 3,323,405. In the device described therein, the electrically adjustable shock absorption is obtained by electrically moving a tapered pin up and down by means of which a fluid opening between the pin and a disc surrounding it changes. In this device provision is made at the end of the pin for a piston whose (non-cylindrical) end at the lowest position of the pin can close off an opening. A shortcoming of this device is that only limited regulation of the fluid throttling is possible, which results in unfavorable shock absorption characteristics. Very high standards also have to be met with respect to the accuracy of positioning of the pin, and it is not possible to achieve different fixed shock absorption positions. Moreover, through the presence of the piston, the pin is impeded in switching quickly to the different positions, and also the inward shock absorption is not adjustable in both directions of piston travel.

SUMMARY OF THE INVENTION

Accordingly, the object of the present invention is to avoid these disadvantages. This object is achieved according to the invention which provides for an electrically adjustable shock absorber of the general type described above in which the fluid openings are provided in the cylinder wall of the case extension portion of the piston and are of such dimensions that they do not impede the flow of the fluid.

According to an important feature of the invention, the slide is provided with at least one through opening which also does not impede the flow of fluid. Accordingly, the actual shock absorption device is separated from the shape of the slide. By making various openings in the case wall, an unlimited number of shock absorption settings can be obtained. These different shock absorption settings apply in both directions of the piston stroke. Because the opening in the slide does not impede the flow, it can be moved up and down very rapidly.

According to a preferred embodiment of the invention, radial throttle openings are provided in the case wall at various different axial levels, and at least one of the openings has a shock absorption device connected to it. This one opening does not itself serve as a throttle opening. Preferably, the case can be designed as an extension of a hollow piston rod and can be provided with another opening near the connection of the extension to the hollow piston rod. Accordingly, the fluid which is at one side of the piston can flow through this additional opening and through the other various openings in the case wall to the other side of the piston.

According to another advantageous embodiment, the at least one shock absorption device includes a body which is slidably sealed relative to the shock absorber outer cylinder and is fixed on the case adjacent to the throttle opening in the case and further includes a one-way valve which opens in one direction of movement of the piston-cylinder assembly. This simple shock absorption device makes very efficient shock absorption possible. This shock absorption device can be further provided with a throttle channel emerging on either side of the body and a second one-way valve which can open on movement of the piston-cylinder assembly in a second direction of movement of the piston-cylinder assembly.

According to a further advantageous embodiment, there is also provided a second opening in the case which is connected to second shock absorption device, which includes a body attached to the case provided with a chamber connected to the appropriate opening in the case. The chamber of the body is provided with two one-way valves which can connect it in both directions of flow with a space of the shock absorption cylinder surrounding the chamber. In this embodiment, the length of the slide is such that it covers either none or one of the two openings provided with a shock absorption device. The opening near the connection point of the case on the hollow piston rod is always open and is never closed by the slide as it moves.

According to a preferred embodiment, the second shock absorption device, unlike the one shock absorption device, is not provided with sealing means and in the first direction of movement the one shock absorption device lies in front of the second shock absorption device. The various one-way valves used can be spring-loaded valves. Also, if desired, instead of one opening, a set of openings which lie in one plane perpendicular to the center line of the case can be used.

In the embodiment with two openings, both of which are provided with a shock absorption device, the slide can be set electrically in three positions, with both openings being cleared or only one of either of the two openings being cleared. The slide can be movable by means of a lead screw which is connected to an electric motor or alternatively with an electromagnet.

The electrical operating device for the slide can be connected to a microprocessor, which in this way sets shock absorption depending on vehicle movement conditions sensed. Accordingly, there can be shock absorption compensation during both braking and acceleration as well as adaptation to both very poor and very good road surfaces. Further the rate of roll of the vehicle during turning can also be limited.

BRIEF DESCRIPTION OF THE DRAWING

The invention will be described in greater detail with reference to the drawing in which.

DETAILED DESCRIPTION OF THE PREFERRED EMBODIMENT

Figure 1:
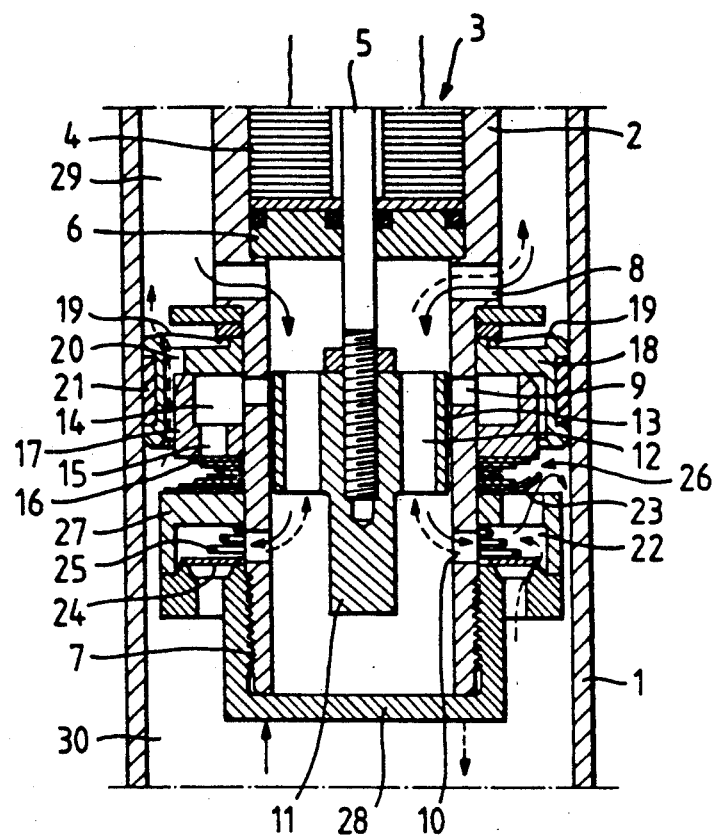
FIG. 1 is a vertical cross sectional view through a preferred embodiment of the invention, with the slide of the shock absorber shown in the top position.

In the drawings, the solid arrows indicate the direction of movement on the outward stroke, and the broken-line arrows indicate the direction of movement on the inward stroke. The same arrow labeling applies to the direction of fluid flow. Throughout this description the terms inward and outward refer to the relative movement between the piston and cylinder in the downward and upward directions respectively as viewed in the drawing. Also, only those portions of the shock absorber necessary for an understanding of the present invention are shown.

The shock absorber includes a shock absorber cylinder 1 and a shock absorber piston rod 2 having a piston attached there. Chassis or wheel parts of the vehicle with which the shock absorber is used can be attached to the ends of the piston rod and cylinder. In the piston-cylinder assembly there is an oil or another shock absorption fluid. Disposed in the shock absorber piston rod 2 is a magnetic device 3 including a coil 4 and a core 5 moveable therein. The core 5 projects through a sealing assembly 6 into a cylindrical case 7 which is an extension portion of the hollow shock absorber rod 2. The cylindrical case 7 is provided with three sets of radial openings 8, 9 and 10 respectively. Fitted movably in the case 7 is a slide 11 which is provided with longitudinal openings 12, through which unimpeded flow of fluid to either side of the slide is provided for. The slide 11 is connected to the core 5. The wall 13 of the slide can, on movement thereof, come to rest disposed between or adjacent either of the openings 9 or 10. The openings 9 are connected by means of a first chamber 14 with an opening 15 against which rests a spring-loaded one-way valve 16. The opening 15 is fitted in a body 17 on which rests a sealing body 18. Both bodies 17, 18 are held apart by the spring assembly of the spring-loaded valves 16 and 23. Sealing body 18 is provided with a one-way valve 19 which can open a channel 20. This channel 20 connects with either side of this first shock absorption device. Sealing body 18 forms with seal 21 the actual sealing between cylinder and piston rod. Opening 10 connects with a second chamber 22 which is provided with one-way valves 23 and 24 respectively. One-way valve 24 is thereby under the load of tapering helical spring 25, while one-way valve 23 is driven by spring assembly 26 into the rest position. The spring assembly 26 also serves to return one-way valve 16 to its initial position. Body 27 which bounds the second chamber 22 is at such a distance from the shock absorber cylinder 1 that fluid can flow freely between them. Case 7 is bounded at the bottom by a bottom cover 28.

Operation of the shock absorber is as follows: in the top position shown in FIG. 1, on outward (upward) movement of the shock absorber, which is indicated by the upwardly directed solid arrow, fluid is displaced from space 29 to space 30. To this end, the fluid flows unimpeded inwards through openings 8. Since wall 13 is in front of opening 9, no fluid can flow through it. One-way valve 19 also prevents the passage of fluid during movement outwards. Accordingly, the fluid is forced to move through opening 10 to space 30. When the fluid has arrived in the second chamber 22, one-way valve 24 prevents further flow, but one-way valve 23 makes it possible for fluid to flow out against the pressure of spring assembly 26, as shown by the solid arrow. On the inward (downward) stroke, which is indicated by the dashed arrow, where fluid has to be displaced in the opposite direction from space 30 to space 29, the fluid can take two paths: first through channel 20 because one-way valve 19 does little or nothing to impede flow in this direction, and second flow is possible through one-way valve 24, opening 10, opening 12 and opening 8 to space 29.

Figure 2:
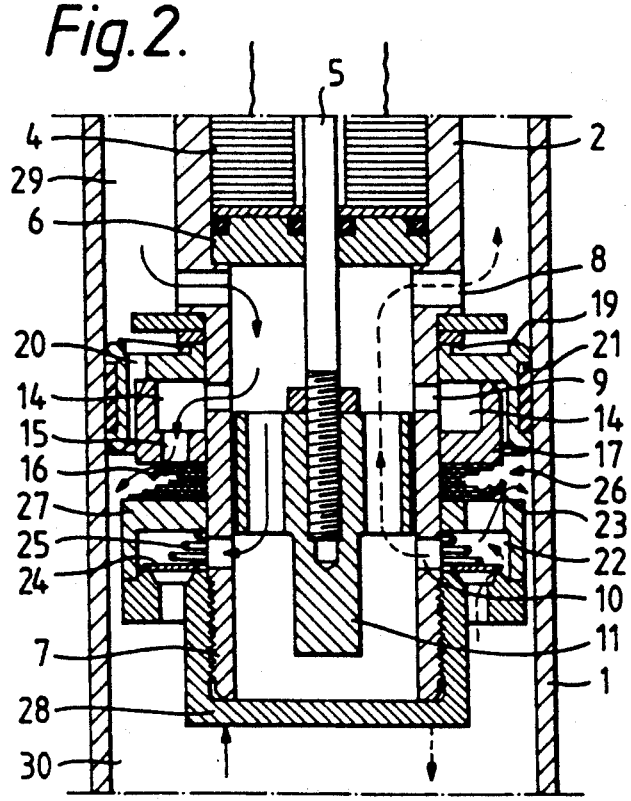
FIG. 2 is a vertical cross sectional view of the preferred embodiment of the invention with the slide of the shock absorber shown in the intermediate position.

In the intermediate position shown in FIG. 2, fluid flows during outward movement out of space 29 to space 30. This can take place not only in the manner described above through openings 8, 12, 10, second chamber 22 and one-way valve 23, but because opening 9 is now open, it can also flow through first chamber 14 and one-way valve 16. This means that the shock absorption is much less than that in the embodiment shown in FIG. 1.

Still referring to the intermediate position shown in FIG. 2, on the inward movement of the shock absorber, which is again shown by dashed lines, the fluid can flow both through one-way valve 19 and through one-way valve 24 and openings 10, 12, 8 from space 30 into space 29. The clearing of opening 9 has no effect on the shock absorption curve of the inward stroke, because one-way valve 16 allows no fluid to pass in that direction.

Figure 3:
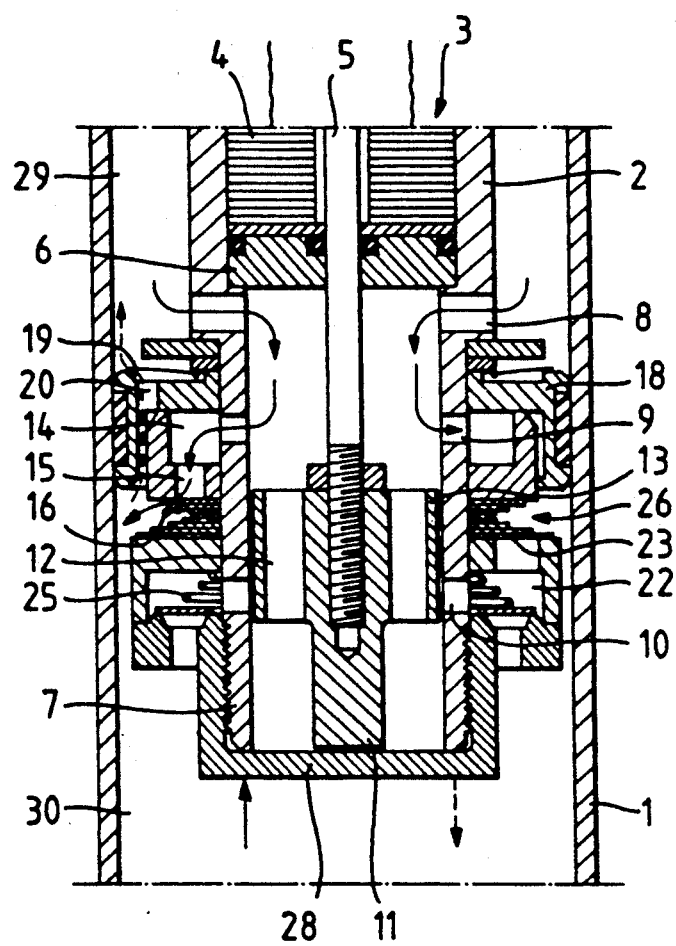
FIG. 3 is a vertical cross sectional view of the preferred embodiment of the invention with the slide of the shock absorber shown in the bottom position.

FIG. 3 shows the bottom position of the slide 11. Opening 10 is closed off by the wall 13 of the slide 11. On the outward stroke, the fluid flows from space 29 to space 30, as indicated by the solid lines. Since opening 10 is closed off, flow through one-way valve 23 is no longer possible. The fluid can now flow only through one-way valve 16 to the outside. On the inward stroke of the shock absorber, the flow path through one-way valve 24 is not possible since the opening 10 is closed. This means that the inward stroke is much more throttled than in the above two examples, since only one-way valve 19 is now available for this.

By varying the diameters of the openings and bores leading to the various one-way valves, three different shock absorption curves in the three different positions of the slide can be obtained for the outward stroke and two different shock absorption curves can be obtained for the inward stroke. Through the use of a slide in combination with separate throttle openings and one-way valves which form the actual shock absorber devices, the accuracy of the positioning of slide 11 is limited to shutting off or opening the intended opening. The accuracy required in closing and opening the various openings is much lower than for the closing of an opening with a tapering shank according to known devices. It must be understood that if desired there can be an ordinary bottom valve at the bottom of the shock absorber in order to avoid overloading. It will also be clear that the position shown in the figures is only an example. It can, of course, be horizontal or turned 180 degrees for actual application.

Although the above is a preferred embodiment of the present invention, it must be understood that various modifications can be made which are to be considered to be within the scope of the appended claims.

What is claimed is:

1. In a hydraulic shock absorber including a hollow fluid filled cylinder, piston means slidably and sealingly received in said cylinder for sliding movement axially of said cylinder and dividing the interior of said cylinder into a first and a second fluid chamber, and valve controlled passage means in said piston means for adjustably controlling the flow of fluid between said chambers induced by movement of said piston means axially of said cylinder;

the improvement wherein said piston means and valve controlled passage means comprise a piston having an axially extending flow chamber therein;

first passage means opening directly from said flow chamber into said first chamber of said cylinder;

second passage means spaced axially of said piston from said first passage means and extending from said flow chamber to said second chamber;

third passage means located axially of said piston between said first and said second passage means and extending from said flow chamber to said second chamber via third passage check valve means oriented to permit flow from said flow chamber into said second chamber and to block flow from said second chamber into said flow chamber;

a remotely controlled valve member mounted in said flow chamber for axial movement relative to said piston means between at least three selected rest positions, said valve member (a) when in a first of said rest positions establishing fluid communication between said flow chamber and said first, second and third passage means;

(b) when in a second rest position blocking fluid communication between said flow chamber and said second passage means while maintaining fluid communication between said flow chamber and said first and third passage means and (c) when in a third rest position blocking fluid communication between said flow chamber and said third passage means while maintaining fluid communication between said flow chamber and said first and second passage means, and bypass passage means through said piston for accommodating flow of fluid from said second chamber to said first chamber while blocking flow from said first chamber to said second chamber.

2. The invention defined in claim 1 wherein said flow chamber is defined in part by a cylindrical side wall coaxially aligned with said cylinder and said first, second and third passage means open into said flow chamber through respective first, second and third ports in said side wall spaced from each other axially of said flow chamber, and said valve member comprises a cylindrical slide member slidably engaged by said side wall of said flow chamber and having flow passage means extending therethrough, said slide member having an axial length greater than the extent of either of said second and third ports axially of said side wall and less than the axial spacing between said second and third ports whereby said slide member may be axially positioned within said flow chamber to selectively establish fluid communication between said flow chamber and either one or both of said second and third ports.

3. The invention defined in claim 2 wherein said second passage means includes at least two branch passages opening from said second passage means into said second chamber, and separate check valve means in said branch passages constituting one of said branch passages as an inlet to said second passage means and the other of said branch passages as an outlet of said second passage means.

* * * * *